(12) United States Patent
Hamano et al.

(10) Patent No.: US 11,685,325 B2
(45) Date of Patent: Jun. 27, 2023

(54) VEHICLE BODY FRONT STRUCTURE

(71) Applicant: HONDA MOTOR CO., LTD., Tokyo (JP)

(72) Inventors: Yoichiro Hamano, Tokyo (JP); Ryo Kita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 17/326,590

(22) Filed: May 21, 2021

(65) Prior Publication Data

US 2021/0370858 A1 Dec. 2, 2021

(30) Foreign Application Priority Data

May 27, 2020 (JP) .............................. JP2020-092673

(51) Int. Cl.
*B60R 19/34* (2006.01)
*B60R 19/18* (2006.01)

(52) U.S. Cl.
CPC .............. *B60R 19/34* (2013.01); *B60R 19/18* (2013.01); *B60R 2019/1806* (2013.01)

(58) Field of Classification Search
CPC .. B60R 19/34; B60R 19/18; B60R 2019/1806
See application file for complete search history.

(56) References Cited

U.S. PATENT DOCUMENTS

| 2017/0129432 | A1* | 5/2017 | Daido | ................... B62D 21/152 |
| 2019/0016283 | A1* | 1/2019 | Fujii | ....................... B60R 19/36 |
| 2021/0046889 | A1 | 2/2021 | Yokota et al. | |

FOREIGN PATENT DOCUMENTS

| JP | 2007-237826 A | 9/2007 |
| JP | 2009-248603 A | 10/2009 |
| JP | 2010-047167 A | 3/2010 |
| JP | 2019-018600 A | 2/2019 |
| JP | 2019177772 A | 10/2019 |

OTHER PUBLICATIONS

Office Action received in corresponding Japanese application No. 2020-092673 dated Dec. 14, 2021 with English translation (7 pages).

* cited by examiner

*Primary Examiner* — Dennis H Redder
*Assistant Examiner* — Melissa Ann Bonifazi
(74) *Attorney, Agent, or Firm* — Rankin, Hill & Clark LLP

(57) ABSTRACT

A vehicle body front structure of a vehicle is provided. The vehicle is equipped with a bumper beam disposed on a front side of a vehicle body and extending in a vehicle width direction. The bumper beam is fixed at its lateral end portions in the vehicle width direction to the vehicle body. A guide member is disposed on each lateral end portion of the bumper beam to cover a laterally outer end surface of the bumper beam in the vehicle width direction. The guide member has a deformation allowance caused to extend in a collision in accordance with a displacement of the bumper beam.

20 Claims, 10 Drawing Sheets

FIG. 11
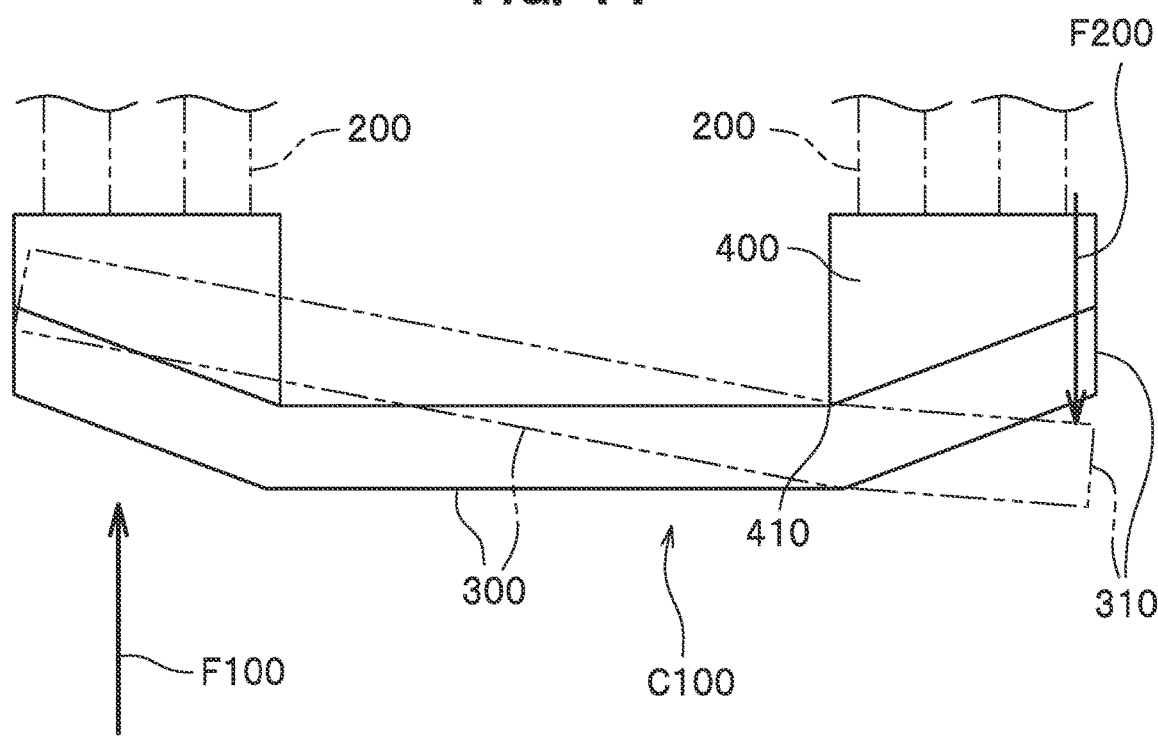
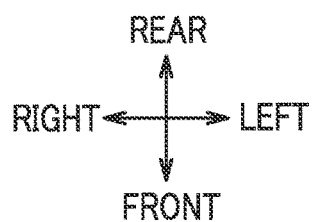

VEHICLE BODY FRONT STRUCTURE

CROSS-REFERENCE TO RELATED APPLICATION

This application claims the benefit of foreign priority to Japanese Patent Application No. 2020-092673, filed on May 27, 2020, which is incorporated by reference in its entirety.

TECHNICAL FIELD

The present invention relates to a vehicle body front structure.

BACKGROUND

A vehicle body structure capable of preventing separation of a bumper beam from a vehicle body upon collision of a vehicle is known, for example, from Japanese Laid-Open Patent Application No. 2019-18600 (see FIGS. 1 and 2). This conventionally known vehicle body structure (1) disclosed in JP 2019-18600 A is configured to prevent separation between a bumper beam (3) and a bumper beam mounting member (4) on the non-collision side in the event of an offset collision of the vehicle.

This vehicle body structure (1) includes a holding member (5) for connecting a laterally outer end portion of the bumper beam (3) and a laterally outer end portion of the bumper beam mounting member (4) that is mounted on a front end of a front side frame (2). The bumper beam mounting member (4) includes a mounting plate (4b) connected to a connecting plate (8) disposed at a front end of the front side frame (2), and a bumper beam extension (4a) provided at a rear surface portion (34) of the bumper beam (3).

According to the vehicle body structure (1) disclosed in JP 2019-18600 A, the holding member (5) for preventing disengagement between the bumper beam extension (4a), the bumper beam (3), and the connecting plate (8) can resist a tensile load applied to the bumper beam (3).

FIG. 11 is an explanatory view showing a small-overlap collision of an ego-vehicle C100 equipped with a holding member (not shown), a bumper beam 300, and a bumper beam extension 400 with another vehicle.

As shown in FIG. 11, a small-overlap collision (also called as narrow offset collision) means a form of a collision in which a vehicle coming from the opposite direction collides with the bumper beam 300 of the ego-vehicle at a laterally outer side of one of a pair of front side frames 200. When the oncoming vehicle collides with the front right end portion of the ego-vehicle C100 and a collision load F100 is applied due to the small-overlap collision, a tensile load F200 acts on the non-collision side of the bumper beam 300. This tensile load F200 pulls the non-collision side laterally outer end 310 of the bumper beam 300 in the frontward direction with the front inner corner portion 410 of the non-collision side bumper beam extension 400 serving as a fulcrum.

SUMMARY

The inventors carried out experiments on head-on collisions between an ego-vehicle and an oncoming vehicle (actual vehicle imitation test piece for a collision test that is made of a honeycomb member). The results of the experiments show that the bumper beam 300 is bent rearward at the center portion thereof with both lateral end portions in the vehicle width direction serving as fulcrums and that the oncoming vehicle may be caught by the laterally outer end 310 of the ego-vehicle when the oncoming vehicle separates from the ego-vehicle and thus may not be separated from the ego-vehicle.

Herein, the term "caught" indicates a state in which the ego-vehicle collides with the oncoming vehicle and a bumper face is torn, so that the laterally outer end 310 of the bumper beam 300 goes into and is caught by the oncoming vehicle.

It is therefore an object of the present invention to provide a vehicle body front structure which can prevent an oncoming vehicle from being caught by a laterally outer end of a bumper beam of an ego-vehicle in a frontal collision between the ego-vehicle and the oncoming vehicle.

In one aspect of the present invention, there is provided a vehicle body front structure of a vehicle, the vehicle comprising a bumper beam disposed on a front side of a vehicle body and extending in a vehicle width direction, wherein the bumper beam is fixed at its lateral end portions in the vehicle width direction to the vehicle body, wherein a guide member is disposed on each lateral end portion of the bumper beam to cover a laterally outer end surface of the bumper beam in the vehicle width direction, and wherein the guide member has a deformation allowance caused to extend in a collision in accordance with a displacement of the bumper beam.

BRIEF DESCRIPTION OF THE DRAWINGS

The drawings described herein are for illustration purposes only and are not intended to limit the scope of the present invention in any way.

FIG. 11 is an explanatory view showing a small-overlap collision of an ego-vehicle equipped with a holding member with another vehicle.

DETAILED DESCRIPTION

A vehicle body front structure A according to one embodiment of the present invention is described below with reference to FIGS. 1 to 7.

In the following description, a "front (frontward direction)" refers to a forward traveling direction of a vehicle, a "rear (rearward direction)" refers to a reversing direction of the vehicle, an "upper (upward direction)" refers to a vertically upward direction of the vehicle, a "lower (downward direction)" refers to a vertically downward direction of the vehicle, and "right" and "left" directions refer to corresponding directions in a vehicle width direction (i.e., lateral direction or right-left direction) of the vehicle. Types and kinds of vehicles are not particularly limited.

<Vehicle Body Front Structure>

Figure 1:
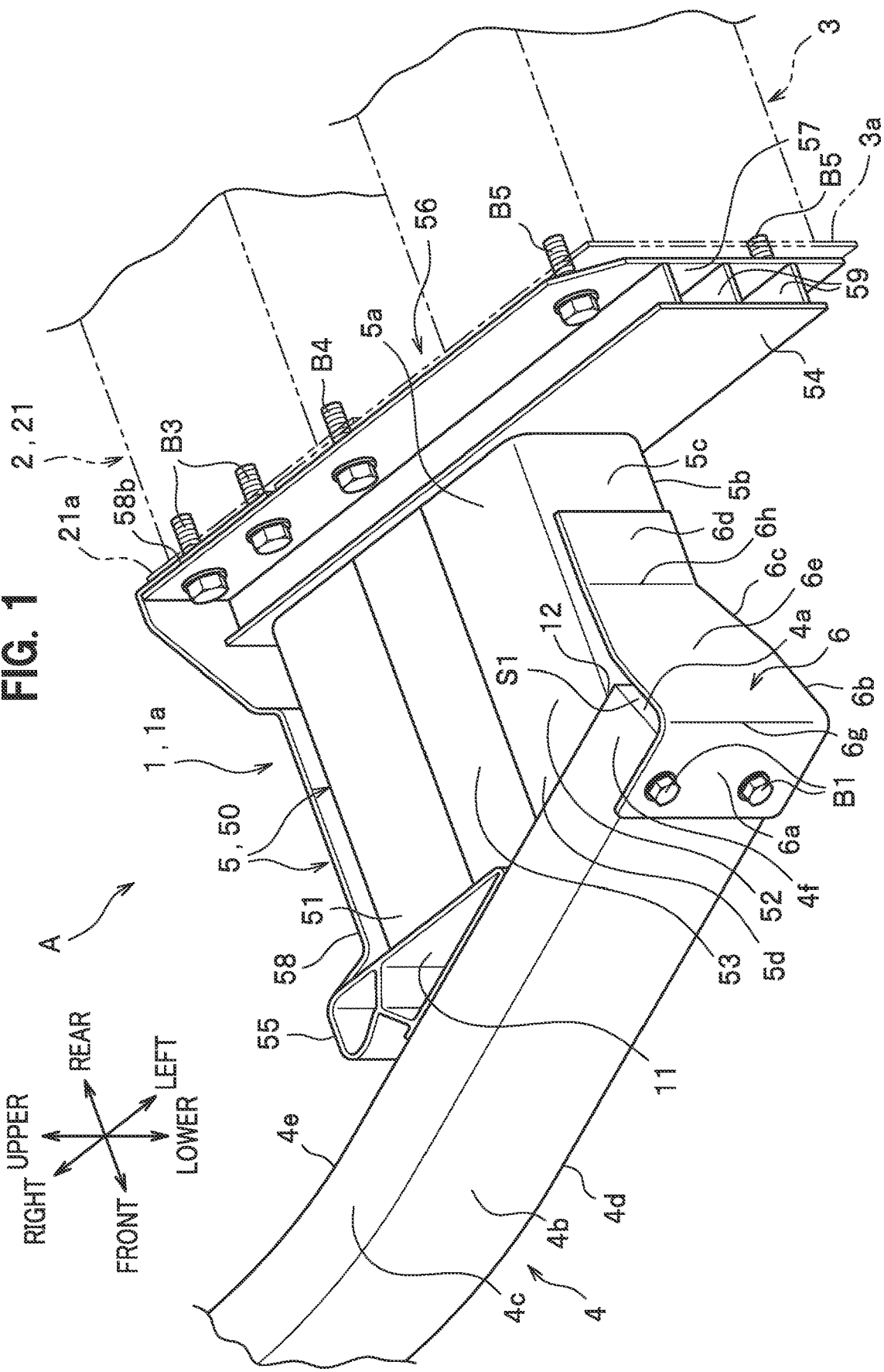
FIG. 1 is a schematic perspective view showing a main part of a vehicle body front structure according to one embodiment of the present invention.

As seen in FIG. 1, a vehicle body front structure A includes a bumper (not shown) having a bumper beam 4 disposed on a front side 1a of a vehicle body 1. The bumper (not shown), a support member 5, a guide member 6, a longitudinal frame 2, a vehicle body frame 3, and the like are disposed on the front side 1a of the vehicle body 1 in a substantially symmetrical manner. Since the front side 1a of the vehicle body 1 has a substantially right-left symmetrical shape, the following description is mainly directed to the left side of the vehicle body 1 and the description of the right side of the vehicle body 1 is omitted where appropriate.

<Bumper>

As seen in FIG. 1, the bumper (not shown) is a member disposed at a front end of the vehicle body 1 and extending in the vehicle width direction. The bumper (not shown) includes a bumper beam 4 joined to front ends of a pair of right and left support members 5 (bumper beam extensions 50), and a bumper face (not shown) attached to a front surface of the bumper beam 4.

<Bumper Beam>

Figure 2:
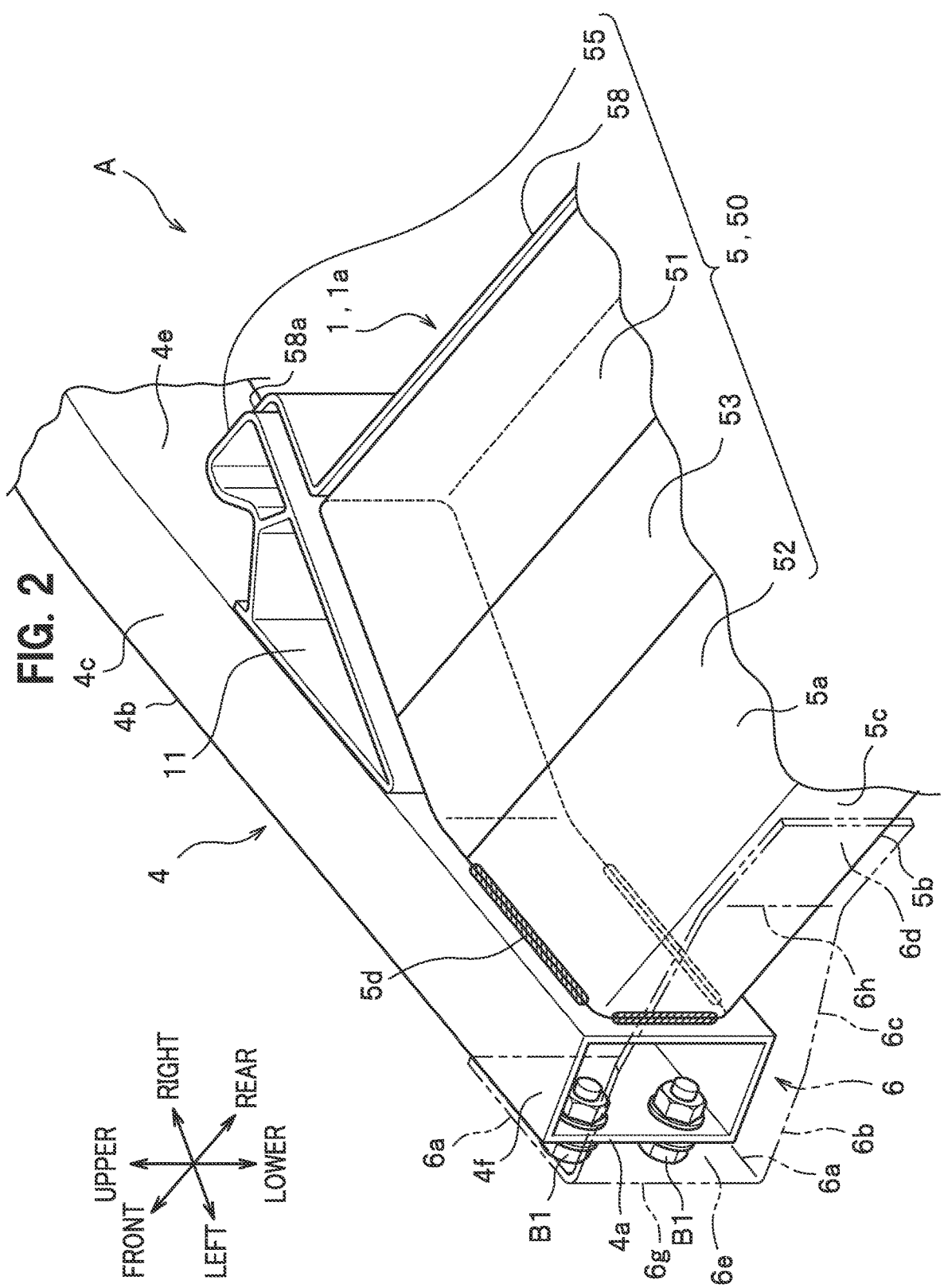
FIG. 2 is a partially enlarged schematic perspective view showing a connecting state between a bumper beam and a support member.
Figure 3:
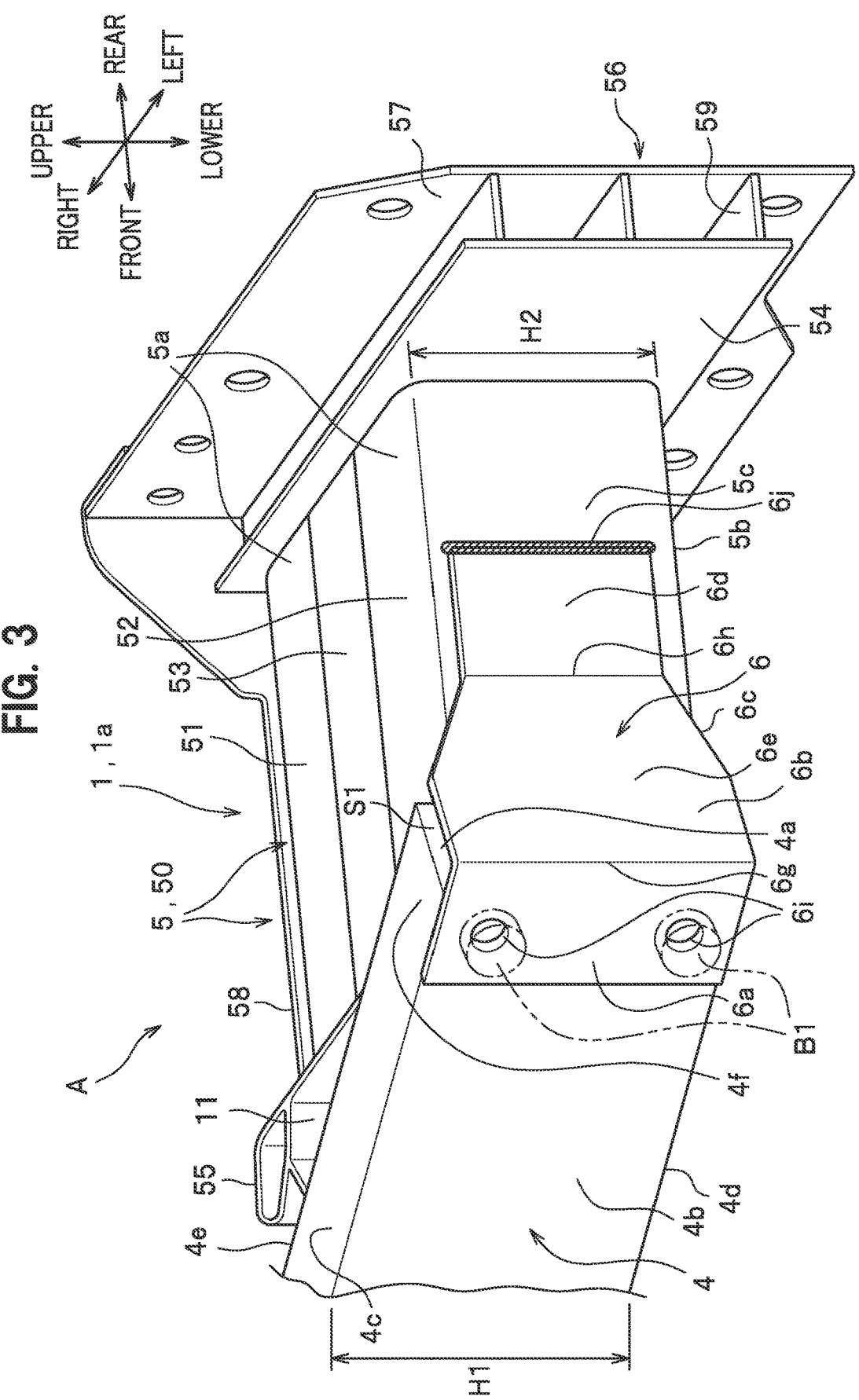
FIG. 3 is a partially enlarged schematic perspective view showing a mounting state of a guide member.

As seen in FIG. 1, the bumper beam 4 is composed of an aluminum alloy member having a vertically orientated rectangular cross-sectional shape, when viewed in a vertical cross-section, and having a front surface 4b, a rear surface 4e, an upper surface 4c, and a lower surface 4d (see FIG. 2). When viewed in a plan view, the bumper beam 4 is bent such that laterally outer end portions 4f (both lateral end portions) in the vehicle width direction are inclined rearward (see FIG. 4). The bumper beam 4 is fixed at its laterally outer end portions 4f to the vehicle body 1. As seen in FIGS. 1 to 3, a guide member 6 is disposed at the laterally outer end portion 4f of the bumper beam 4 with a gap S1 interposed therebetween. The guide member 6 covers an end surface (laterally outer end surface) 4a of the laterally outer end portion 4f through the gap S1.

Figure 4:
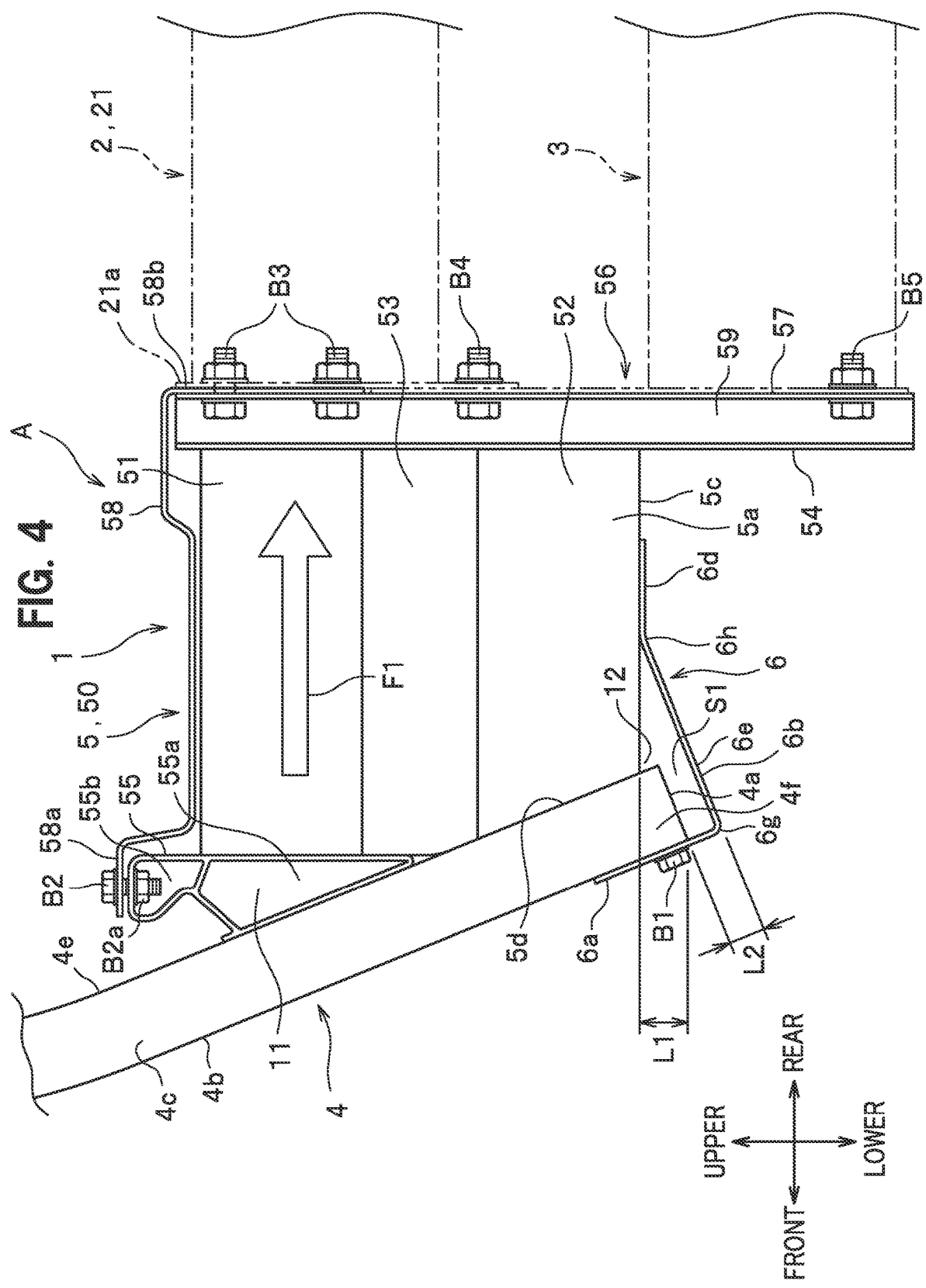
FIG. 4 is a partially enlarged schematic plan view showing the mounting state of the guide member.

As seen in FIG. 3, the height H1 of the bumper beam 4 is larger than the height H2 of the support member 5. As seen in FIG. 4, the end surface 4a (side surface) of the laterally outer end portion 4f of the bumper beam 4 protrudes outward in the vehicle width direction by the distance L1 from an outer surface (laterally outer surface in the vehicle width direction) 5c of the support member 5. Therefore, when viewed in a plan view, a stepped portion 12 is formed between the laterally outer end portion 4f of the bumper beam 4 and the outer surface 5c of the support member 5.

The bumper face (not shown) is composed of a cushioning member made of resin or metal. The bumper face (not shown) is mounted on the bumper beam 4 to cover the front side of the bumper beam 4.

<Support Member>

The support member 5 is a member for supporting the bumper beam 4. The support member 5 has a front end portion attached to the rear surface 4e of the bumper beam 4, and a rear end portion attached to the longitudinal frame 2 and the vehicle body frame 3. As seen in FIG. 1, a bumper beam mounting member 55 is fixed to the front end of the support member 5. The support member 5 is composed of a plurality of bumper beam extensions 50 extending in a longitudinal direction (front-rear direction) of the vehicle body 1. A support frame 56 extending in the vehicle width direction is provided on the rear end portion of the support member 5.

The support member 5 is configured such that the farther rearward from the front side of the vehicle body 1, the higher in strength of the support member 5. To change the strength of the support member 5, for example, the wall thickness or the number of ribs (partition walls) may be increased, from the front side toward the rear side of the vehicle body 1.

<Bumper Beam Extension>

As seen in FIG. 1, the bumper beam extension 50 is a cushioning member configured to collapse and buckle when an ego-vehicle collides with an oncoming vehicle and the like, to thereby absorbing an impact load. The bumper beam extension 50 is interposed between the bumper beam 4, the longitudinal frame 2 and the vehicle body frame 3. The bumper beam extension 50 includes, for example, a first extension 51, a second extension 52, a third extension 53, a mounting plate portion 54, a bumper beam mounting member 55, a support frame 56, a flange portion 57, and a connecting plate 58. The bumper beam extension 50 is composed of the first extension 51, the second extension 52, and the third extension 53, each having a rectangular tubular shape extending in the longitudinal (front-rear) direction and disposed continuously and adjacently in the vehicle width direction.

As seen in FIG. 4, the first extension 51 is disposed at a laterally inner side of the bumper beam extension 50 in the vehicle width direction. The first extension 51 is arranged substantially on an imaginary line extending from a front side frame 21 extending in the longitudinal direction.

The second extension 52 is disposed at a laterally outer side of the bumper beam extension 50 in the vehicle width direction. A front end of the second extension 52 is inclined rearward toward outside (i.e., inclined such that the farther outer in the vehicle width direction, the more rearwardly positioned in the longitudinal direction). An upper portion, a lower portion, and a laterally outer end portion of the front end of the second extension 52 are welded to the rear surface 4e of the bumper beam 4 (see FIG. 2). The second extension 52 is arranged frontward of the vehicle body frame 3.

The third extension 53 is disposed between the first extension 51 and the second extension 52 in the vehicle width direction of the bumper beam extension 50.

The mounting plate 54 is connected to rear end surfaces of the first extension 51, the second extension 52, and the third extension 53. The mounting plate 54 is arranged frontward of the longitudinal frame 2 and the vehicle body frame 3.

The bumper beam mounting member 55 is a member for mounting the first extension 51 and the third extension 53 to the rear surface 4e of the bumper beam 4. The bumper beam mounting member 55 is disposed in a notch 11 formed between the first extension 51, the third extension 53, and the rear surface 4e of the bumper beam 4. The bumper beam mounting member 55 is composed of a generally tubular member having a wedge-like first hollow portion 55a, and a second hollow portion 55b adjacent to the first hollow portion 55a in the vehicle width direction. The bumper beam mounting member 55 is disposed in the notch 11 and extends in the vehicle width direction. The bumper beam mounting member 55 is attached to the front ends of the first extension 51 and the third extension 53. A front wall of the bumper beam mounting member 55 is in contact with the rear surface 4e of the bumper beam 4.

The first hollow portion 55a is a tubular portion disposed between the first extension 51, the third extension 53, and the bumper beam 4 and having a generally triangular shape as viewed in a plan view.

The second hollow portion 55b is a space for an internal screw portion B2a of a fastener B2. The fastener B2 is used for fixing a connecting plate 58 (to be described later) to the bumper beam mounting member 55.

As seen in FIG. 4, when viewed in a plan view, the notch 11 is a generally V-shaped space extending between the bumper beam 4 and the front end of the support member 5. The notch 11 opens gradually wider toward the inner side in the vehicle width direction. The notch 11 serves as an impact absorption portion for allowing deformation of the bumper beam 4 in the event of a collision of the vehicle. The notch 11 is arranged substantially on an imaginary line extending from the longitudinal frame 2 (front side frame 21 and the like) extending in the longitudinal direction of the vehicle body 1.

The support frame 56 shown in FIG. 3 includes a plurality of band-shaped flat plate portions 59 disposed between the mounting plate portion 54 and the flange portion 57. The flat plate portions 59 are arranged in the vertical (upper-lower) direction with a predetermined distance spaced apart therebetween, and extend in the vehicle width direction. Each of the flat plate portions 59 is fixed such that a front end thereof is joined to the mounting plate portion 54 and a rear end thereof is joined to the flange portion 57. The support frame 56 is integrally formed of an aluminum alloy member, for instance, and includes generally rectangular-shaped closed sections extending in the vehicle width direction between the mounting plate portion 54 and the flange portion 57.

As seen in FIG. 1, the flange portion 57 is a plate-like member provided at the rear ends of the flat plate portions 59. The flange portion 57 is superposed on and connected to a rear connecting portion 58b of the connecting plate 58, a side frame flange portion 21a of the front side frame 21, and a flange portion 3a of the vehicle body frame 3 by fasteners B3, B4, B5. When viewed from the front side, the flange portion 57 has a breadth (lateral width) same as that of the mounting plate portion 54 and a vertical length (height in the upper-lower direction) longer than that of the mounting plate portion 54. Each of the front side frame 21 and the vehicle body frame 3 is made of a high strength steel sheet (high tensile strength steel sheet).

As seen in FIG. 4, the connecting plate 58 is a member for connecting the bumper beam mounting member 55 disposed on the front end of the support member 5, the flange portion 57 disposed on the rear end of the support member 5, and the side frame flange portion 21a of the front side frame 21. The connecting plate 58 is formed of a metal plate member that extends long in the longitudinal direction. The connecting plate 58 is disposed laterally inward of the support member 5 in the vehicle width direction. The connecting plate 58 includes a front connecting portion 58a formed at the front end portion thereof, and a rear connecting portion 58b formed at the rear end portion thereof. The front connecting portion 58a is fastened to the bumper beam mounting member 55. The rear connecting portion 58b is formed by bending the rear end portion of the connecting plate 58 outward in the vehicle width direction. The rear connecting portion 58b is disposed between the flange portion 57 and the front side frame 21.

<Guide Member>

As seen in FIGS. 1 to 4, the guide member 6 is disposed on each lateral end portion of the bumper beam 4 in the vehicle width direction to cover an end surface (laterally outer end surface) 4a, to thereby prevent a stepped portion 12 from being exposed from the outer side in the vehicle width direction between the bumper beam 4 and the support member 5. The guide member 6 is a member for connecting the bumper beam 4 and the support member 5. The guide member 6 is formed of a plate-like member made of metal, and covers at least the front surface 4b and the end surface (side surface) 4a of the bumper beam 4 from a height of the upper surface 4c to a height of the lower surface 4d. Therefore, the guide member 6 covers each lateral end portion of the bumper beam 4; the lateral end portions of the bumper beam 4 protrude outward in the vehicle width direction from the outer surfaces (laterally outer surface in the vehicle width direction) 5c of the support members 5.

As seen in FIG. 3, the guide member 6 has a front end portion 6a, a fastener installation hole 6i, a bent portion 6g, a bumper side cover portion 6b, a deformation allowance 6e, an inclined portion 6c, a bent portion 6h, a rear end portion 6d, and a fixing portion 6j that are formed in this order from the front end side toward the rear side of the guide member 6.

The front end portion 6a is fastened to the front surface 4b of each lateral end portion of the bumper beam 4.

As seen in FIGS. 3 and 4, the bumper side cover portion 6b is provided to extend from a laterally end portion of the front end portion 6a in an obliquely rearward and laterally inward direction. The front end portion 6a and the bumper side cover portion 6b are formed by bending the guide member 6 substantially at right angles, and the thus formed bent part constitutes the bent portion 6g.

The bumper side cover portion 6b is a portion disposed outward of the end surface 4a of the lateral end portion of the bumper beam 4. As seen in FIG. 4, the bent portion 6g and the bumper side cover portion 6b are disposed laterally outward of the end surface (side surface) 4a of the bumper beam 4 in the vehicle width direction at positions spaced apart by the distance L2.

As seen in FIGS. 1 and 3, the inclined portion 6c is formed to narrow, when viewed from the side, from the position corresponding to the rear surface 4e of the bumper beam 4 toward the rear side of the vehicle body 1 such that an upper side and a lower side of the bumper side cover portion 6b are inclined to be narrower to the height corresponding to a distance between a height position of the upper surface 5a of the support member 5 for supporting the bumper beam 4 and a height position of the lower surface 5b of the support member 5. The height positions of rear ends of the upper and lower sides of the inclined portion 6c may coincide with height positions of the upper surface 5a and the lower surface 5b of the support member 5.

As seen in FIG. 3, the rear end portion 6d is in contact with the outer surface 5c located at a laterally outer side of the second extension 52 in the vehicle width direction and is fixed to the outer surface 5c. The rear end of the guide member 6 has a fixing portion 6j, by which the guide member 6 is fixed to the outer surface 5c of the support member 5. Since the guide member 6 has the front end portion 6a connected to the front surface 4b of the laterally outer end portion 4f of the bumper beam 4 and the rear end portion 6d connected to the outer surface (laterally outer surface in the vehicle width direction) 5c of the support members 5, the guide member 6 serves as a bracket for preventing the bumper beam 4 and the support member 5 from being separated from each other.

As seen in FIGS. 3 and 4, the bent portion 6h is a portion formed by bending the guide member 6 at an obtuse angle. The bent portion 6h is formed between the rear end portion 6d extending in the longitudinal direction and the bumper side cover portion 6b extending in an obliquely frontward and leftward direction from the front end of the rear end portion 6d.

Figure 5:
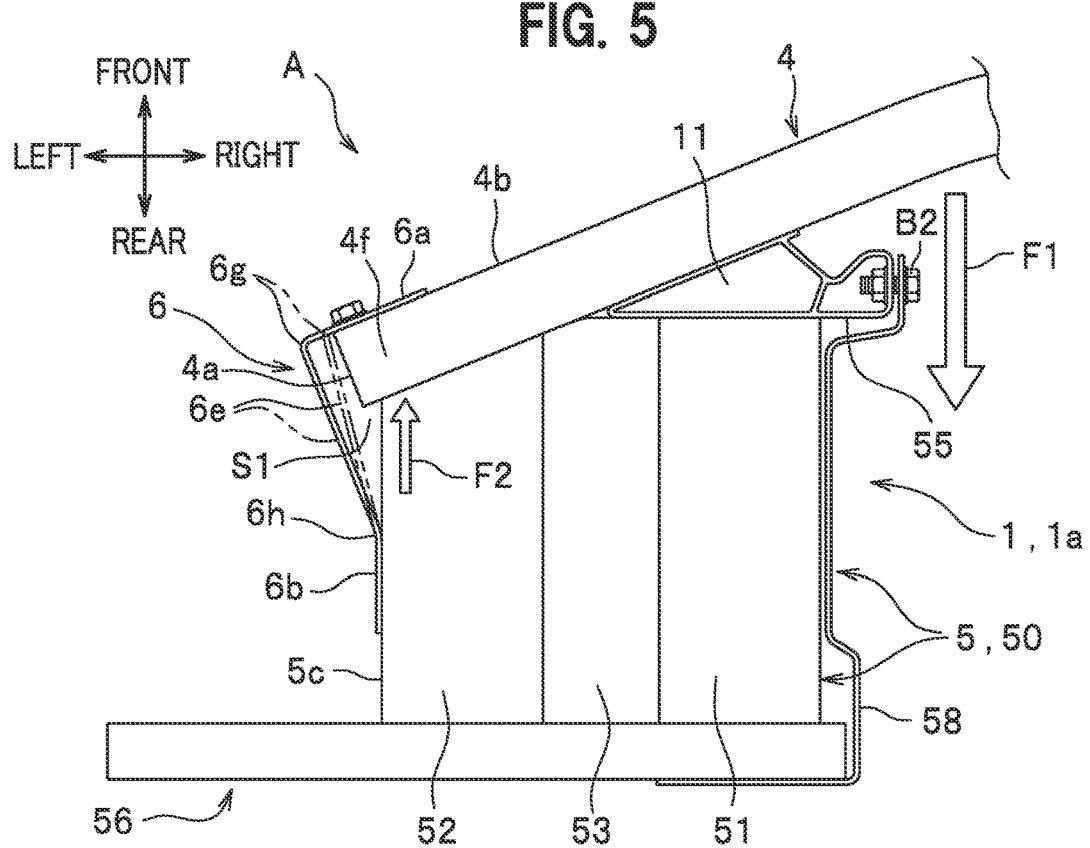
FIG. 5 is a partially enlarged schematic plan view showing an initial stage of the guide member in the event of a head-on collision of an oncoming vehicle with an ego-vehicle.
Figure 6:
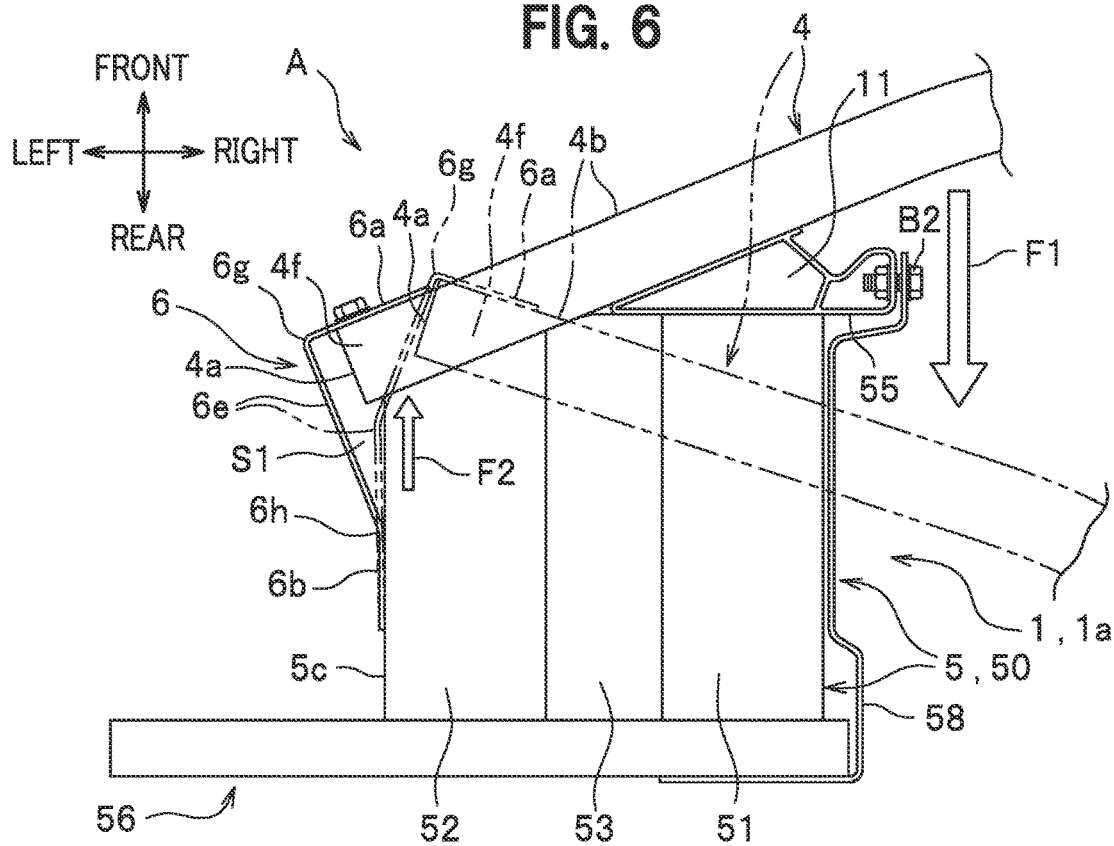
FIG. 6 is a partially enlarged schematic plan view showing a middle stage of the guide member in the event of the head-on collision of the oncoming vehicle with the ego-vehicle.

As seen in FIG. 4, the deformation allowance 6e is a portion caused to extend when a tensile force is applied. The deformation allowance 6e is easily deformable because a gap S1 is formed between the guide member 6, the end surface 4a on each lateral end portion of the bumper beam 4, and the outer surface 5c of the second extension 52. When viewed in a plan view, the deformation allowance 6e is formed between the front end portion 6a and the rear end portion 6d of the guide member 6. As seen in FIGS. 5 and 6, the deformation allowance 6e is formed by the bent portion 6g of the front end portion 6a and the bent portion 6h of the rear end portion 6d. The bent portion 6g is caused to deform when a tensile load F2 in the frontward direction is applied to the laterally outer end portion 4f of the bumper beam 4 in the event of a frontal collision. The deformation allowance 6e deforms such that the bent portions 6g, 6h extend (stretch) frontward in the longitudinal direction when a load in the longitudinal direction is applied to the guide member 6.

The fixing portion 6j is a portion for fixing the guide member 6 to the outer surface 5c of the support member 5. The fixing portion 6j is joined to the support member 5 by welding the whole area of the rear end of the guide member 6 to the support member 5.

<Longitudinal Frame>

The longitudinal frame 2 is a pair of right and left framework frame members extending in the longitudinal direction of the vehicle body 1. The longitudinal frame 2 is a front side frame 21 for instance.

<Front Side Frame>

As seen in FIG. 1, the front side frame 21 is a pair of right and left framework members extending in the longitudinal direction of the vehicle body 1. The front side frame 21 is formed by combining generally U-shaped cross-sectional members (not shown), or may be formed by one or more generally rectangular cross-sectional members. The side frame flange portion 21a is joined to a front open end of the front side frame 21.

The side frame flange portion 21a is a flat plate having a rectangular shape when viewed from the front side. The side frame flange portion 21a is fixed to the flange portion 57 and the connecting plate 58 using a fastener B1 such as a bolt and a rivet.

<Vehicle Body Frame>

The vehicle body frame 3 is a pair of right and left framework frame members arranged outward of the pair of right and left longitudinal frames 2 (front side frames 21). For example, the vehicle body frame 3 corresponds to upper members or lower members disposed along upper parts of wheel houses.

<Operation of Vehicle Body Front Structure>

With reference to FIGS. 1 to 7, the operation of the vehicle body front structure A according to this embodiment of the present invention is described by way of an example in which an ego-vehicle collides head-on with an oncoming vehicle.

As seen in FIG. 4, when an ego-vehicle equipped with the vehicle body front structure A according to this embodiment collides head-on with an oncoming vehicle, a central portion of the bumper (not shown) of the ego-vehicle is pressed rearward by the oncoming vehicle. Accordingly, the bumper (not shown) receives an impact load F1 through the bumper face (not shown) at a laterally central portion of the bumper beam 4 in the vehicle width direction.

As shown in chain double-dashed lines of FIG. 6, the laterally central portion of the bumper beam 4 is bent rearward by the impact load F1 with the laterally outer end portion 4f of the bumper beam 4 serving as a fulcrum. This causes the bumper beam mounting member 55 to collapse and then the bumper beam extension 50 to collapse, to thereby absorb the impact load F1.

Since the bumper beam mounting member 55 has the notch 11 formed to open gradually wider toward the laterally inner side in the vehicle width direction, when the bumper beam 4 is pressed rearward in the event of a collision, the bumper beam mounting member 55 collapses more easily than other framework members.

The first extension 51 of the bumper beam extension 50 includes the mounting plate portion 54 of the support frame 56, for example, made of an aluminum alloy, the flange portion 57, the flat plate portions 59, and the front side frame 21 that are arranged on the rear side thereof. With this configuration, it is possible to reduce the weight at the front side 1a of the vehicle body 1 while enhancing the rigidity at the rear side of the bumper beam extension 50 and to increase the absorbing property for the impact load F1 using the easily collapsing first extension 51.

Therefore, in the event of a frontal collision, as seen in FIGS. 5 and 6, a tensile load F2 that pulls the bumper beam 4 in the frontward direction is applied to the bumper beam 4 with the laterally outer end portion 4f (front end portion of the second extension 52) serving as a fulcrum.

The guide member 6 has the deformation allowance 6e formed to cover the end surface 4a of the lateral end portion with the gap 51 interposed therebetween, and is connected to the front surface 4b of the laterally outer end portion 4f of the bumper beam 4 and to the outer surface (laterally outer surface in the vehicle width direction) 5c of the support members 5. The guide member 6 has the bent portions 6g, 6h at the front side and at the rear side of the deformation allowance 6e.

Therefore, as seen in FIG. 5, when the tensile load F2 is applied to the laterally outer end portion 4f of the bumper beam 4, the bent portions 6g, 6h of the guide member 6 are pulled and deform, and the deformation allowance 6e extends (stretches) and comes into contact with the laterally outer end portion 4f of the bumper beam 4.

When the guide member 6 is further pulled frontward by the tensile load F2, as seen in FIG. 6, the rear side of the deformation allowance 6e comes into contact with the laterally outer surface 5c of the support member 5, and the front side of the deformation allowance 6e is pulled inward in the vehicle width direction by the thus deforming bumper beam 4.

Figure 7:
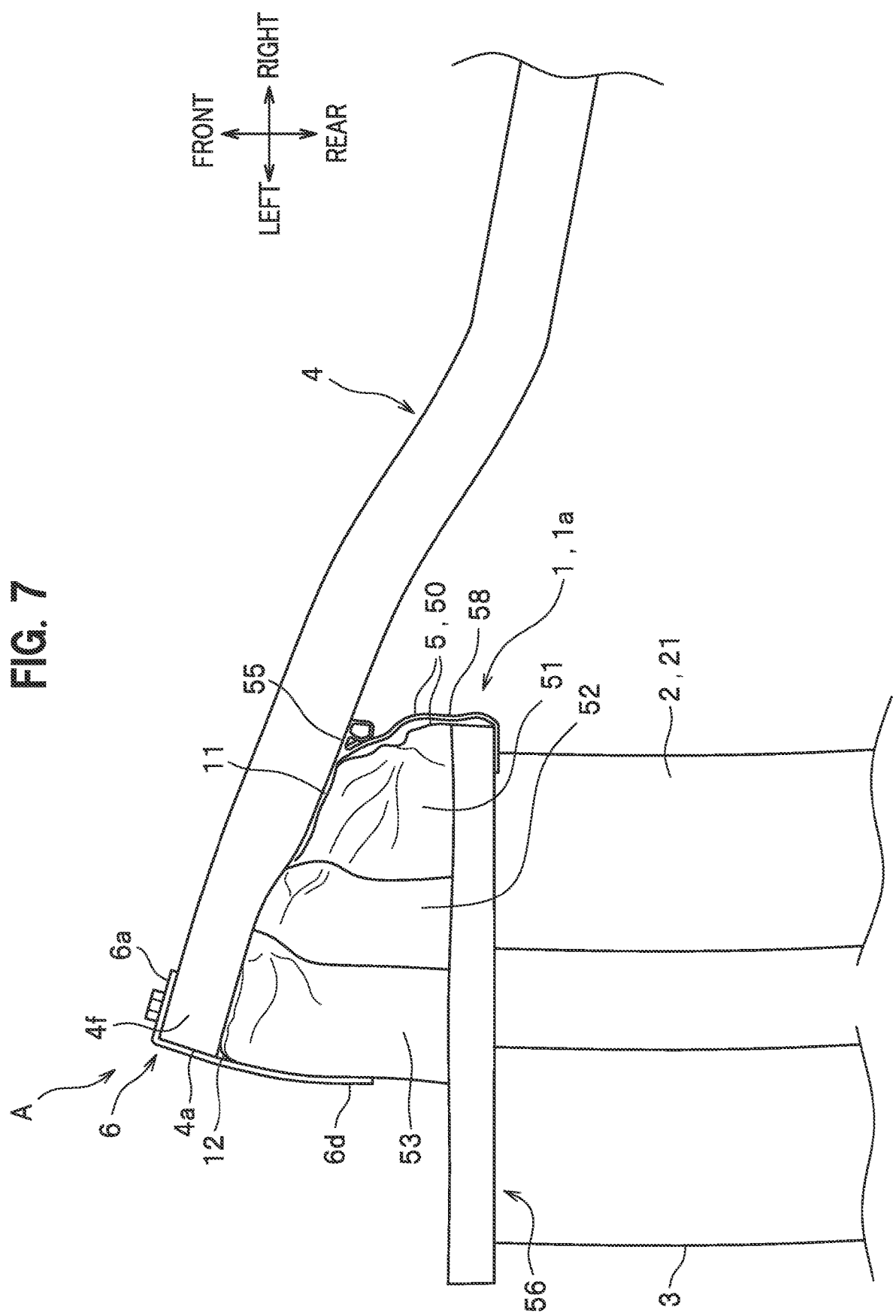
FIG. 7 is a partially enlarged schematic plan view showing a late stage of the guide member in the event of the head-on collision of the oncoming vehicle with the ego-vehicle.

Accordingly, as seen in FIG. 7, the end surface 4a of the bumper beam 4 does not protrude outward in the vehicle width direction from the laterally outer surface 5c of the support member 5, thereby eliminating the stepped portion 12 with respect to the support member 5 to provide a flat surface.

As a result, when the ego-vehicle collides head-on with an oncoming vehicle, the vehicle body front structure A can prevent the oncoming vehicle from being caught by the stepped portion 12 of the ego-vehicle formed between the laterally outer end portion 4f of the bumper beam 4 and the laterally outer surface 5c of the support member 5.

As described above, the vehicle body front structure A of a vehicle according to one embodiment of the present invention includes the bumper beam 4 disposed on the front side 1a of the vehicle body 1 and extending in the vehicle width direction. As seen in FIGS. 1 and 3, the vehicle body front structure A is preferably configured such that the bumper beam 4 is fixed at its lateral end portions (laterally outer end portions) 4f in the vehicle width direction to the vehicle body 1, that the guide member 6 is disposed on each lateral end portion of the bumper beam 4 to cover the end surface (laterally outer end surface) 4a of the bumper beam 4 in the vehicle width direction, and that the guide member 6 has the deformation allowance 6e caused to extend in a collision in accordance with a displacement of the bumper beam 4.

The term "vehicle body 1" refers to the support member 5 (bumper beam extension 50), the front side frame 21, the vehicle body frame 3 (upper members, lower members), a subframe 8 (see FIG. 10), and the like.

With this configuration, the vehicle body front structure A includes the deformation allowance 6e that is provided on the guide member 6 configured to cover the end surface 4a of the laterally outer end portion 4f of the bumper beam 4. In the event of a collision, the guide member 6 can eliminate the stepped portion 12 formed with respect to a member (support member 5) disposed on the rear side of the bumper beam 4 and provide a covering surface for covering the end surface 4a of the laterally outer end portion 4f. Since the lateral end portions of the bumper face each for covering the laterally outer end portion 4f of the bumper beam 4 and the laterally outer surface 5c of the support member 5 can be formed into a rounded shape, the degree of freedom in exterior design can be improved.

When the ego-vehicle collides head-on with the oncoming vehicle, the bumper beam 4 is bent rearward at the center portion thereof with both lateral end portions in the vehicle width direction serving as fulcrums. The guide member 6 forms a guide surface for providing slider effect so that when the deformation allowance 6e extends frontward in the longitudinal direction, the colliding oncoming vehicle separating from the ego-vehicle is guided while sliding frontward on the guide member 6. Therefore, the guide member 6 prevents the colliding oncoming vehicle from being caught by the stepped portion 12 located at the laterally outer end portion 4f of the bumper beam 4 of the ego-vehicle, so that the oncoming vehicle can be easily separated from the ego-vehicle.

The deformation allowance 6e of the vehicle body front structure A can prevent a breakage at the connecting portion between the front end of the guide member 6 and the bumper beam 4 or at the connecting portion between the rear end of the guide member 6 and the vehicle body 1 due to stress concentration. Further, the vehicle body front structure A is less likely to be bent at the bumper beam 4 by the provision of the deformation allowance 6e, to thereby prevent a decrease in absorption of the impact energy.

As seen in FIGS. 1 and 3, it is preferable that the guide member 6 covers the front surface 4b and the end surface 4a of the bumper beam 4 throughout the height from the upper surface 4c to the lower surface 4d of the bumper beam 4.

With this configuration, since the guide member 6 is disposed to cover the front surface 4b and the end surface (side surface) 4a of the bumper beam 4 throughout the height from the upper surface 4c to the lower surface 4d of the bumper beam, the guide member 6 entirely covers the end surface 4a of the bumper beam 4. This can prevent the oncoming vehicle from being caught by the end surface (laterally outer end surface) 4a of the bumper beam 4 when the ego-vehicle collides head-on with the oncoming vehicle.

As seen in FIGS. 1 and 3, the vehicle body front structure A further includes the support member 5 for supporting the rear surface 4e of the bumper beam 4, and it is preferable that the guide member 6 is made of a plate member having a pair of upper and lower inclined portions (a pair of upper and lower inclined sides of the inclined portion 6c) inclined, when viewed from the side, to approach each other with rearward distance from the rear surface 4e of the bumper beam 4, and that the height positions of the rear ends of the pair of upper and lower inclined portions correspond to height positions of the upper surface and the lower surface of the support member 5.

With this configuration of the vehicle body front structure A, even if the bumper beam 4 protrudes outward in the vehicle width direction from the support member 5, the inclined portions (the pair of upper and lower inclined sides of the inclined portion 6c) can prevent the oncoming vehicle from being caught by the laterally outer end portion 4f of the bumper beam 4 in the event of a frontal collision.

Further, as seen in FIGS. 4 and 5, it is preferable that the front end portion 6a of the guide member 6 is fixed to the front surface 4b of the bumper beam 4 and the rear end portion 6d of the guide member 6 is fixed to the outer surface 5c of the support member 5, and that the deformation allowance 6e is disposed between the front end portion 6a and the rear end portion 6d of the guide member 6.

With this configuration of the vehicle body front structure A, a bumper beam assembly including the bumper beam 4, the pair of right and left support members 5, and the guide members 6 each fixed to the bumper beam 4 and the corresponding support member 5 can be fixed to the vehicle body 1 such as the front side frame 21 and the subframe 8. This can improve the assembling property and the handling property. Further, since the guide member 6 has the deformation allowance 6e, the guide member 6 is easily deformable at a portion where the deformation allowance 6e is formed.

Further, as seen in FIGS. 4 and 5, the deformation allowance 6e is preferably formed by the bent portion 6g formed in the front end portion 6a and the bent portion 6h formed in the rear end portion 6d.

With this configuration, when the laterally central portion of the bumper beam 4 is bent in the event of a frontal collision and the tensile load F2 that pulls the laterally outer end portion 4f frontward in the longitudinal direction is applied, the guide member 6 deforms such that the bent portions 6g, 6h serving as the deformation allowance 6e are caused to extend. Since the guide member 6 is connected to the laterally outer end portion 4f of the bumper beam 4, as seen in FIG. 6, the guide member 6 allows the bumper beam 4 to rotate with the laterally outer end portion 4f serving as a fulcrum, while preventing the bumper beam 4 from being separated from the support member 5.

Further, as seen in FIGS. 4 and 5, the rear end of the guide member 6 is preferably joined to the outer surface 5c of the support member 5 for supporting the bumper beam 4.

With this configuration, since the rear end of the guide member 6 is joined to the outer surface 5c, it is possible to prevent the rear end of the guide member 6 from deforming and thus protruding outward from the outer surface 5c of the support member 5 due to the tensile load F2 generated in the event of a frontal collision. The guide member 6 can eliminate a caught portion at which the oncoming vehicle is caught when the ego-vehicle collides head-on with the oncoming vehicle. Further, the weight of the guide member 6 can be reduced by reducing the length of the guide member 6 in the longitudinal direction.

Further, as seen in FIG. 4, the vehicle body front structure A further includes the support member 5 for supporting the rear surface 4e of the bumper beam 4, and it is preferable that the lateral end portions of the bumper beam 4 are inclined rearward toward outside (i.e., inclined such that the farther outward in the vehicle width direction, the more rearwardly positioned in the vehicle). The front end portion of the support member 5 has a laterally outer portion and a laterally inner portion in the vehicle width direction, and it is preferable that the bumper beam fixing portion 5d for fixing the bumper beam 4 is provided on the laterally outer portion, and the generally V-shaped notch 11 is formed between the bumper beam 4 and the laterally inner portion of the support member 5. The notch opens gradually wider toward the inner side in the vehicle width direction.

With this configuration of the vehicle body front structure A, since the notch 11 is formed between the bumper beam 4 and the laterally inner portion of the front end portion of the support member 5, the notch 11 collapses in the event of a frontal collision, so that the laterally central portion of the bumper beam 4 is bent rearward with the laterally outer end portion 4f of the bumper beam 4 serving as a fulcrum. Accordingly, the notch 11 can increase the impact absorbing amount of the bumper beam 4 to decrease the deformation amount of the vehicle body 1 in the event of a frontal collision, to thereby enhance the collision performance. Further, since the notch 11 is hollow and has a generally V-shaped configuration formed to open gradually wider toward the inner side in the vehicle width direction, it is possible to reduce the weight of the vehicle body front structure A.

Further, as seen in FIG. 1, it is preferable that the bumper beam mounting member 55 having a shape corresponding to the notch 11 is fixed to the laterally inner portion of the front end portion of the support member 5, that the support frame 56 extending in the vehicle width direction is provided on the rear end portion of the support member 5, that the longitudinal frame 2 extending in the longitudinal direction of the vehicle body 1 is disposed rearward of the support member 5, and that the notch 11 is arranged on the imaginary line extending from the longitudinal frame 2.

With this configuration of the vehicle body front structure A, providing the bumper beam mounting member 55 and the notch 11 causes the front side of the support member 5 to easily collapse to absorb the impact load F1 when the ego-vehicle collides head-on with an oncoming vehicle. The rear side of the support member 5 is reinforced by the support frame 56 and securely held by the longitudinal frame 2. Therefore, since the bumper beam mounting member 55 and the support member 5 collapse to close the notch 11 and to absorb the impact load F1 when the ego-vehicle collides head-on with the oncoming vehicle and the bumper beam 4 is bent, the longitudinal frame 2 having a narrow width can securely support the bumper beam 4.

Further, as seen in FIG. 1, the support member 5 is composed of a plurality of bumper beam extensions (first, second and third extensions 51, 52, 53 of the bumper beam extension 50) extending in the longitudinal direction of the vehicle body 1 to enhance the strength of the vehicle body 1.

With this configuration of the vehicle body front structure A, since the support member 5 is composed of a plurality of bumper beam extensions and has a higher strength at the rear side of the vehicle body front structure A, the support member 5 gradually collapses from the front end thereof in the event of a frontal collision, to thereby increase the absorbing amount for the impact force applied to the bumper beam 4. Accordingly, the support member 5 can reduce the impact load in the event of a frontal collision and transmit the reduced impact load to the front side frame 21.

Although one embodiment of the present invention has been described above, the present invention is not limited to the above specific embodiment and various changes and modifications may be made where appropriate within the scope of the technical idea of the present invention. It is to be understood that the present invention covers such variations and modifications. In the following modifications, like or similar parts those described in the above-described embodiment are denoted by the same reference numerals and detailed description thereof will be omitted.

First Modified Embodiment

Figure 8:
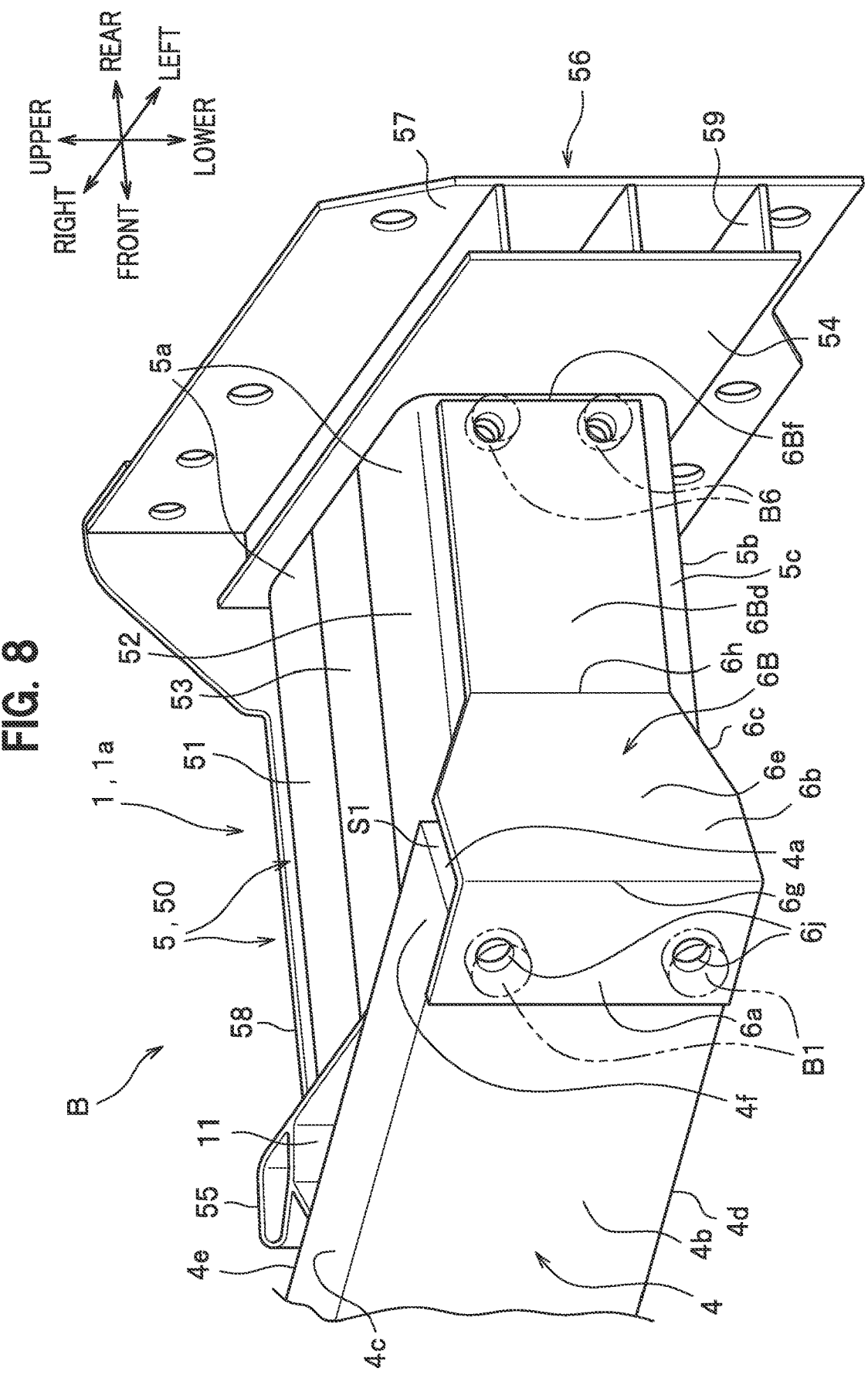
FIG. 8 is a schematic perspective view showing a main part of a vehicle body front structure according to a first modified embodiment.

FIG. 8 is a schematic perspective view showing a main part of a vehicle body front structure B according to a first modified embodiment.

As seen in FIG. 8, the rear end 6Bf of the guide member 6B may extend to the vicinity of the mounting plate portion 54 disposed at the rear end of the support member 5.

With this configuration, since the rear end 6Bf of the guide member 6B extends to the vicinity of the mounting plate portion 54 located at the rear end of the support member 5, the overlap amount between the rear end 6Bf and the oncoming vehicle can be reduced when the ego-vehicle collides head-on with the oncoming vehicle. Accordingly, the rear end 6Bd of the guide member 6B is not subject to a large load in the event of a frontal collision, so that the guide member 6B can be fixed using simple fasteners B6 such as bolts.

Second Modified Embodiment

Figure 9:
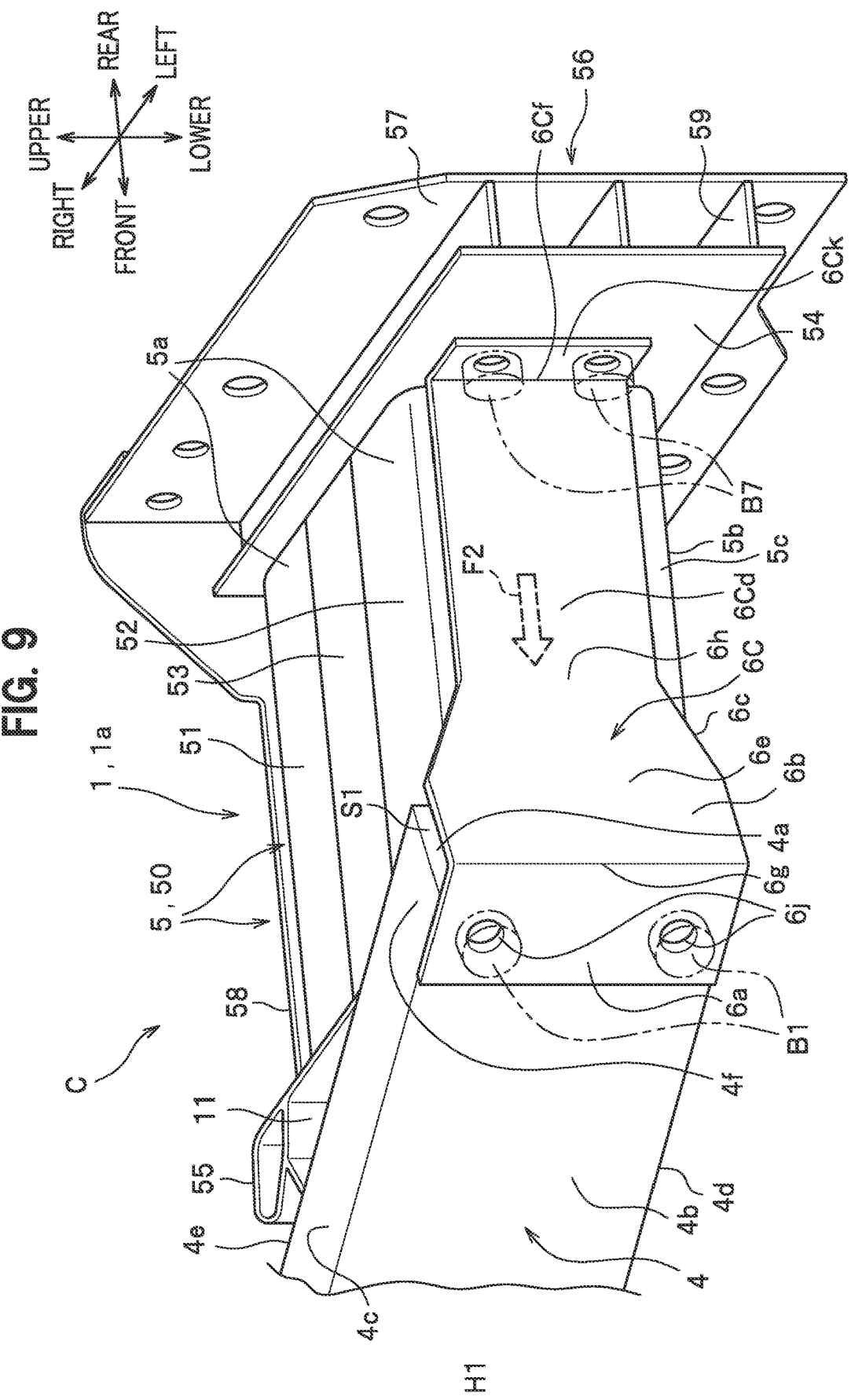
FIG. 9 is a schematic perspective view showing a main part of a vehicle body front structure according to a second modified embodiment.

FIG. 9 is a schematic perspective view showing a main part of a vehicle body front structure C according to a second modified embodiment.

As seen in FIG. 9, the rear end 6Cf of the guide member 6C may be bent to protrude outward in the vehicle width direction and fixed to the mounting plate portion 54.

According to this configuration, the rear end 6Cf of the guide member 6C is bent outward in the vehicle width direction to protrude outward in the vehicle width direction and fixed to the mounting plate portion 54. When the oncoming vehicle abuts on the mounting plate portion 54 in the event of a collision and a tensile load F2 that pulls the bumper beam 4 frontward in the longitudinal direction is applied, the guide member 6C serves as a guide surface on which the abutting portion of the oncoming vehicle slides from the front surface 4b of the bumper beam 4 to the mounting plate portion 54. Therefore, it is possible to prevent the oncoming vehicle from being caught by the laterally outer end portion 4f of the bumper beam 4 that protrudes outward in the vehicle width direction or the laterally outer surface 5c of the support member 5.

Further, since the guide member 6C has the flange portion 6Ck formed by bending the guide member 6C at the rear end 6Cf to protrude outward in the vehicle width direction, the flange portion 6Ck can be easily and firmly fixed to the mounting plate portion 54 using fasteners B7 such as bolts.

Third Modified Embodiment

Figure 10:
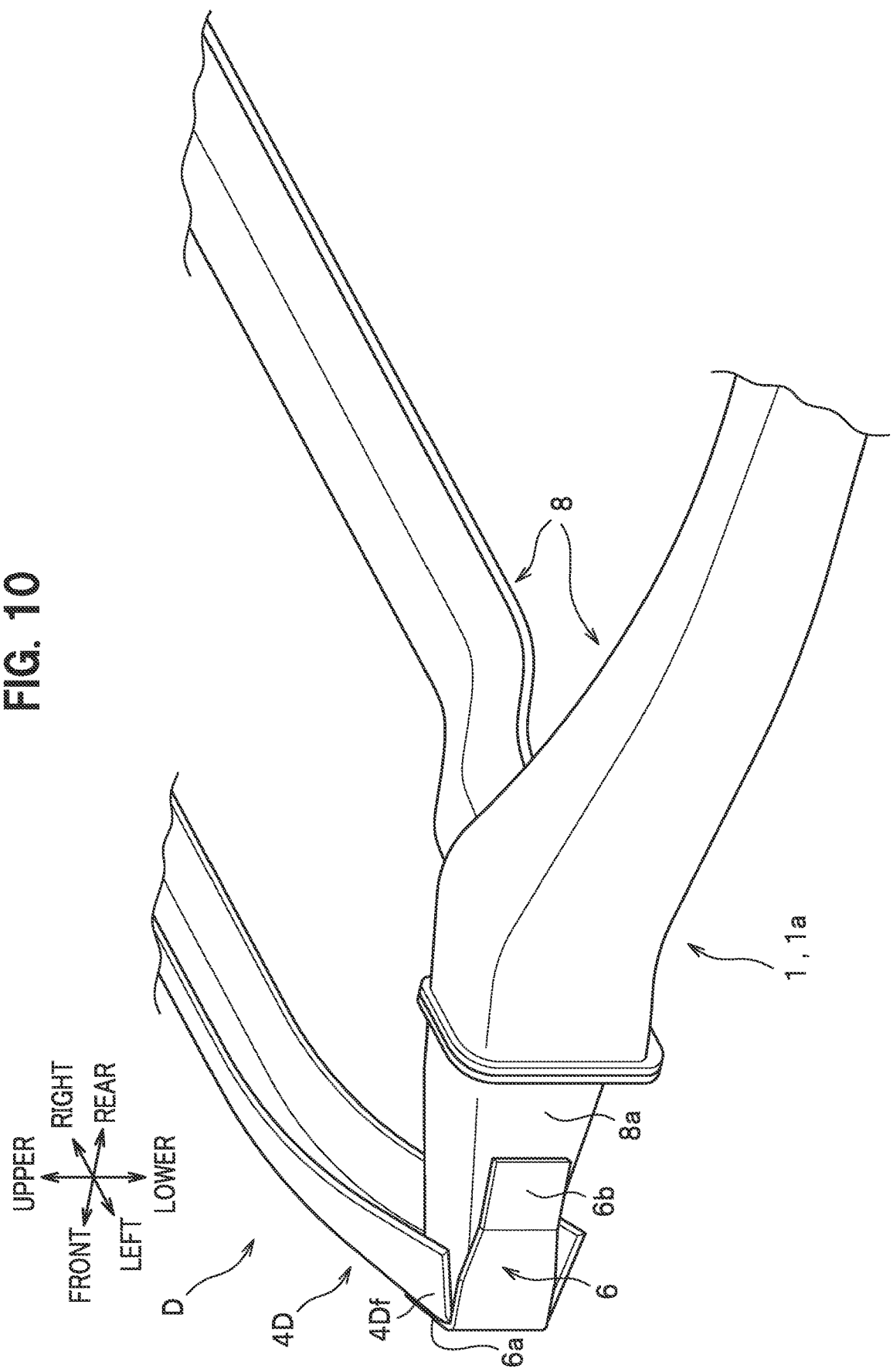
FIG. 10 is a schematic perspective view showing a main part of a vehicle body front structure according to a third modified embodiment.

FIG. 10 is a schematic perspective view showing a main part of a vehicle body front structure D according to a third modified embodiment.

As seen in FIG. 10, the guide member 6 may be fixed to a front end portion of a front side frame (not shown) or to the front end portion 8a of the subframe 8.

In this modification, the front end portion 6a of the guide member 6 is fixed to the laterally outer end portion 4Da of the bumper beam 4D, and the rear end portion 6d of the guide member 6 is fixed to the laterally outer surface of the front end portion of the front side frame (not shown) or to the laterally outer surface of the front end portion 8a of the subframe 8. Accordingly, since the laterally outer end portion 4Da of the bumper beam 4D, the laterally outer surface of the front end portion of the front side frame (not shown), and the laterally outer surface of the front end portion 8a of the subframe 8 are covered by the guide member 6, they do not protrude outward in the vehicle width direction.

With this configuration, in the event of a frontal collision, the guide member 6 is less likely to be caught by a portion that is easily caught by the guide member 6, such as the front end portion of the front side frame (not shown), and the front end portion 8a of the subframe 8.

Other Modifications

For example, the bent portions 6g, 6h may be modified, where appropriate, as long as they are configured to deform frontward when a frontward tensile load F2 is applied to the laterally outer end portion 4f of the bumper beam 4 as shown in FIGS. 5 and 6.

Further, for example, the bent portions 6g, 6h may be bent or curved in different directions other than those described in the above embodiment, or the dimensions or the number of the bent portions 6g, 6h may be changed, or these modifications may be combined where appropriate.

By way of example, the front bent portion 6g may be bent inward and the rear bent portion 6h may be bent outward so that the gap 51 is formed at the laterally outer side of the bumper beam 4 in the vehicle width direction.

Further, as seen in FIG. 1, the vehicle body front structure A according to the above-described embodiment has been described such that, as an example, the bumper beam extension 50 (support member 5) is composed of the first extension 51, the second extension 52, the third extension 53, the mounting plate portion 54, the bumper beam mounting member 55, the support frame 56, the flange portion 57, the connecting plate 58, and the flat plate portion 59. However, the structure, the material and the like of the bumper beam extension 50 are for illustrative purposes only and are not limited to this specific embodiment. As long as the bumper beam extension 50 has a cushioning property, the first extension 51, the second extension 52, and the third extension 53 may be formed of a single tubular member.

What is claimed is:

1. A vehicle body front structure of a vehicle, the vehicle comprising a bumper beam disposed on a front side of a vehicle body and extending in a vehicle width direction,
wherein the bumper beam is fixed at its lateral end portions in the vehicle width direction to the vehicle body,
wherein a guide member is disposed on each lateral end portion of the bumper beam to cover a laterally outer end surface of the bumper beam in the vehicle width direction,
wherein the guide member has a deformation allowance caused to extend in a collision in accordance with a displacement of the bumper beam,
wherein the guide member covers a front surface and the laterally outer end surface of the bumper beam throughout a height from an upper surface to a lower surface of the bumper beam,
wherein the vehicle body front structure further comprises a support member for supporting a rear surface of the bumper beam,
wherein the guide member is made of a plate member having a pair of upper and lower inclined portions inclined, when viewed from a side, to approach each other with rearward distance from the rear surface of the bumper beam, and
wherein height positions of rear ends of the pair of upper and lower inclined portions correspond to height positions of an upper surface and a lower surface of the support member.

2. The vehicle body front structure according to claim 1, wherein a front end portion of the guide member is fixed to the front surface of the bumper beam, and a rear end portion of the guide member is fixed to an outer surface of the support member, and
wherein the deformation allowance is disposed between the front end portion and the rear end portion of the guide member.

3. The vehicle body front structure according to claim 2, wherein the deformation allowance is formed by a bent portion formed in the front end portion and a bent portion formed in the rear end portion.

4. The vehicle body front structure according to claim 1, wherein a rear end of the guide member is joined to an outer surface of the support member for supporting the bumper beam.

5. The vehicle body front structure according to claim 1, wherein a rear end of the guide member extends to a vicinity of a mounting plate portion disposed at a rear end of the support member.

6. The vehicle body front structure according to claim 5, wherein the rear end of the guide member is bent to protrude outward in the vehicle width direction and fixed to the mounting plate portion.

7. The vehicle body front structure according to claim 1, wherein the lateral end portions of the bumper beam are inclined rearward toward outside,
wherein a front end portion of the support member has a laterally outer portion and a laterally inner portion in the vehicle width direction,
wherein a bumper beam fixing portion for fixing the bumper beam is provided on the laterally outer portion, and
wherein a generally V-shaped notch is formed between the bumper beam and the laterally inner portion of the support member, the notch opening gradually wider toward an inner side in the vehicle width direction.

8. The vehicle body front structure according to claim 7, wherein a bumper beam mounting member having a shape corresponding to the notch is fixed to the laterally inner portion of the front end portion of the support member, wherein a support frame extending in the vehicle width direction is provided on a rear end portion of the support member, wherein a longitudinal frame extending in a longitudinal direction of the vehicle body is disposed rearward of the support member, and wherein the notch is arranged on an imaginary line extending from the longitudinal frame.

9. The vehicle body front structure according to claim 1, wherein the support member is composed of a plurality of bumper beam extensions extending in a longitudinal direction of the vehicle body to enhance strength of the vehicle body.

10. The vehicle body front structure according to claim 1, wherein the guide member is fixed to a front end portion of a front side frame or to a front end portion of a subframe.

11. A vehicle body front structure of a vehicle, the vehicle comprising a bumper beam disposed on a front side of a vehicle body and extending in a vehicle width direction,
    wherein the bumper beam is fixed at its lateral end portions in the vehicle width direction to the vehicle body,
    wherein a guide member is disposed on each lateral end portion of the bumper beam to cover a laterally outer end surface of the bumper beam in the vehicle width direction,
    wherein the guide member has a deformation allowance caused to extend in a collision in accordance with a displacement of the bumper beam,
    wherein the vehicle body front structure further comprises a support member for supporting a rear surface of the bumper beam,
    wherein the lateral end portions of the bumper beam are inclined rearward toward outside,
    wherein a front end portion of the support member has a laterally outer portion and a laterally inner portion in the vehicle width direction,
    wherein a bumper beam fixing portion for fixing the bumper beam is provided on the laterally outer portion, and
    wherein a generally V-shaped notch is formed between the bumper beam and the laterally inner portion of the support member, the notch opening gradually wider toward an inner side in the vehicle width direction.

12. The vehicle body front structure according to claim 11, wherein the guide member covers a front surface and the laterally outer end surface of the bumper beam throughout a height from an upper surface to a lower surface of the bumper beam.

13. The vehicle body front structure according to claim 12, wherein
    the guide member is made of a plate member having a pair of upper and lower inclined portions inclined, when viewed from a side, to approach each other with rearward distance from the rear surface of the bumper beam,
    wherein height positions of rear ends of the pair of upper and lower inclined portions correspond to height positions of an upper surface and a lower surface of the support member,
    wherein a front end portion of the guide member is fixed to the front surface of the bumper beam, and a rear end portion of the guide member is fixed to an outer surface of the support member, and
    wherein the deformation allowance is disposed between the front end portion and the rear end portion of the guide member.

14. The vehicle body front structure according to claim 13, wherein the deformation allowance is formed by a bent portion formed in the front end portion and a bent portion formed in the rear end portion.

15. The vehicle body front structure according to claim 11, wherein a rear end of the guide member is joined to an outer surface of the support member for supporting the bumper beam.

16. The vehicle body front structure according to claim 12, wherein
    the guide member is made of a plate member having a pair of upper and lower inclined portions inclined, when viewed from a side, to approach each other with rearward distance from the rear surface of the bumper beam,
    wherein height positions of rear ends of the pair of upper and lower inclined portions correspond to height positions of an upper surface and a lower surface of the support member, and
    wherein a rear end of the guide member extends to a vicinity of a mounting plate portion disposed at a rear end of the support member.

17. The vehicle body front structure according to claim 16, wherein the rear end of the guide member is bent to protrude outward in the vehicle width direction and fixed to the mounting plate portion.

18. The vehicle body front structure according to claim 11, wherein a bumper beam mounting member having a shape corresponding to the notch is fixed to the laterally inner portion of the front end portion of the support member,
    wherein a support frame extending in the vehicle width direction is provided on a rear end portion of the support member,
    wherein a longitudinal frame extending in a longitudinal direction of the vehicle body is disposed rearward of the support member, and
    wherein the notch is arranged on an imaginary line extending from the longitudinal frame.

19. The vehicle body front structure according to claim 12, wherein
    the guide member is made of a plate member having a pair of upper and lower inclined portions inclined, when viewed from a side, to approach each other with rearward distance from the rear surface of the bumper beam,
    wherein height positions of rear ends of the pair of upper and lower inclined portions correspond to height positions of an upper surface and a lower surface of the support member, and
    wherein the support member is composed of a plurality of bumper beam extensions extending in a longitudinal direction of the vehicle body to enhance strength of the vehicle body.

20. The vehicle body front structure according to claim 11, wherein the guide member is fixed to a front end portion of a front side frame or to a front end portion of a subframe.

* * * * *